(12) United States Patent
Phelan

(10) Patent No.: US 6,240,360 B1
(45) Date of Patent: May 29, 2001

(54) COMPUTER SYSTEM FOR INDENTIFYING LOCAL RESOURCES

(76) Inventor: Sean Phelan, 24 Merton Rise, London NW3 3EN (GB)

( * ) Notice: Subject to any disclaimer, the term of this patent is extended or adjusted under 35 U.S.C. 154(b) by 0 days.

(21) Appl. No.: 09/011,691

(22) PCT Filed: Aug. 16, 1996

(86) PCT No.: PCT/GB96/01996

§ 371 Date: Feb. 13, 1998

§ 102(e) Date: Feb. 13, 1998

(87) PCT Pub. No.: WO97/07467

PCT Pub. Date: Feb. 27, 1997

(30) Foreign Application Priority Data

Aug. 16, 1995 (GB) .................................................. 9516762

(51) Int. Cl.[7] .................................................. G09G 1/123
(52) U.S. Cl. .................. 701/208; 701/207; 701/212; 345/133; 345/113
(58) Field of Search .................. 345/133, 113; 701/208, 212, 200, 201, 207, 27; 340/990, 995; 395/200.09, 200

(56) References Cited

U.S. PATENT DOCUMENTS

| | | | | |
|---|---|---|---|---|
| 5,682,525 | * | 10/1997 | Bouve et al. .................. | 395/615 |
| 5,701,451 | * | 12/1997 | Rogers et al. .................. | 395/600 |
| 5,748,109 | * | 5/1998 | Kosaka et al. .................. | 340/995 |
| 5,796,634 | * | 8/1998 | Craport et al. .................. | 364/559 |
| 5,848,373 | * | 12/1998 | DeLorme et al. .................. | 701/200 |
| 5,852,810 | * | 12/1998 | Sotiroff et al. .................. | 705/27 |

FOREIGN PATENT DOCUMENTS

| | | |
|---|---|---|
| 379 198 | 7/1990 | (EP) . |
| 539 143 | 4/1993 | (EP) . |

OTHER PUBLICATIONS

1994 Vehicle Navigation and Information Systems Conference Proceedings (Cat. No. 94ch35703), proceeding of vnis'94–1994 vehicle navigation and information systems conference, Yokohama, Japan Aug. 31–Sep. 2, 1994, pp. 591–596.

Database, Apr.–May 1995, USA, vol. 18, No. 2, ISSN 0162–4105, pp. 65–67, XP000612268 Davis P: An interactive hypermedia map viewer.

* cited by examiner

Primary Examiner—William A. Cuchlinski, Jr.
Assistant Examiner—Marthe Marc-Coleman
(74) Attorney, Agent, or Firm—Pillsbury Winthrop LLP

(57) ABSTRACT

A map of the area of a client computer (10) is requested from a map server (11). Information relating to a place of interest is requested from an information server (12) by the client computer (10). The information is superimposed or overlaid on a map image at a position on the map image corresponding to the location of the place of interest on the map. The information (or "overlay") server (12) may contain details of, for example, hotels, restaurants, shops or the like, associated with the geographical coordinates of each location. The map server (11) contains map data, including coordinate data representing the spatial coordinates of at least one point on the area represented by the map.

37 Claims, 2 Drawing Sheets

US 6,240,360 B1

COMPUTER SYSTEM FOR INDENTIFYING LOCAL RESOURCES

This application is the national phase of international application PCT/GB96/01996 filed Aug. 15, 1996 which designated the U.S

BACKGROUND OF THE INVENTION

1. Field of the Invention

This invention relates to computer systems, and to methods of operating computer systems. The invention has particular relevance to the so called "World Wide Web", which is part of the global computer network system known as the Internet.

2. Description of the Related Art

The Internet and the World Wide Web ("WWW" or "The Web") have been described in great detail in a large number of publications in recent months. The Web consists essentially of an enormous number (at the last count, many millions, and expanding rapidly) of "host" or "server" computers which contain information of various types which users may wish to access. Users of the system employ a "client" computer, running "client" software, in order to access the information. Such client programs are usually known as "browsers".

Various standard protocols enable requests to be formulated by the many client computers, and passed via the Internet to whichever computer holds the relevant information, which then returns the information to the client, using the same protocols.

The protocol which is used on the World Wide Web is an agreed standard, known as the HyperText Transfer Protocol (HTTP).

The language in which "Web" pages are generated is known as "HyperText Markup Language" (HTML).

The success of HTML/HTTP is based to a large extent on the ability of HTTP to produce so called "hypertext links" in the form of some sort of displayable icon on the computer screen of the client. The icon may be a graphical icon, or, more commonly, simply text represented in a form which is visually distinct from the surrounding text. Activating the icon with a pointing device (for example, clicking on it with a mouse pointer) causes the browser software to formulate a request for further information to be sent to the "client". This further information may be simply a "page" of text data, or it may be graphical data, or sound or video data. It may reside on the same server computer as the page containing the hypertext link, but need not do so, and will often reside on a computer many thousands of miles away.

The World Wide Web has recently attracted increasing attention as an advertising medium for various goods and services. The advantage of the Web as an advertising medium is that a single connection allows access by millions of potential customers around the world, without any need for the customers to know or be interested in the physical location of the server computer which is providing the information. Links to the pages of interest may be provided by hundreds or thousands of other pages, provided on other servers, throughout the world.

For many goods and services, the lack of a physical "place" on the Internet is an advantage. A consumer, no matter where his location, is presented with a familiar interface, which makes access very straightforward. The very size of the World Wide Web however, means that, as presently constituted, it is not well suited to answering questions about places and proximity. For example, it is not possible, using existing Web search tools to answer questions such as "where is the nearest hamburger restaurant?" in spite of the enormous benefit which would accrue to major restaurant chains and the like in providing their own answers to such questions, with the speed and ease for which the Internet is famous.

SUMMARY OF THE INVENTION

The present invention seeks to address the problem of facilitating access by Internet users, and in particular by users of the World Wide Web, to Internet resources, where the primary differentiator between different places of interest is geographical.

According to a first aspect of the present invention, there is provided a method of operating a computer system, the method comprising the steps of:

storing on a map server computer map data representative of a map of a geographical area; storing on the map server computer coordinate data indicative of the spatial coordinates of at least one point associated with the geographical area represented by the map, so as to enable correlation of points on the map with their corresponding geographical location;

storing on an information server computer information data relating to at least one place of interest within the geographical area, said information data including data representative of the spatial coordinates of the place of interest within the area;

transmitting a map request to the map server computer from a client computer, and transmitting from the map server computer to the client computer in response to the map request the map data and the coordinate data associated with the area represented by the map;

utilizing the map data to display an image of the map on a visual display unit associated with the client computer;

transmitting an information request to the information server computer from the client computer, and transmitting from the information server computer to the client computer in response to the information request the information data relating to at least one place of interest within the geographical area; and, displaying the information data relating to at least one place of interest on the visual display unit.

The map request may be transmitted before the information request, the information request being formulated by including coordinate data provided by the map server.

The information request may be transmitted before the map request, the map request being formulated by including coordinate data provided by the information server.

According to a second aspect of the present invention, there is provided a computer system, the computer system comprising:

a map server computer for storing map data representative of a map of a geographical area and coordinate data representative of the spatial coordinates of at least one point lying within the area represented by the map;

an information server computer for storing information data representative of at least one place of interest within the geographical area, said data including data representative of the spatial coordinates of the place of interest within the area; and, a client computer, the client computer having a visual display unit;

wherein the client computer includes
> means for transmitting a map request to the map server computer to request transfer to the client computer of the map data and the coordinate data associated with the area represented by the map,
>
> means for displaying an image of the map on the visual display unit, and
>
> means for transmitting an information request to the information server computer to identify places of interest known to it and lying within the geographical area,
>
> wherein the information server computer includes means for transmitting to the client computer in response to the information request the data representative of at least one place of interest within the geographical area, and
>
> wherein the client computer includes means for displaying said data associated with the place of interest on the visual display unit.

The order in which the map server and information server are mentioned above is not meant to imply any particular restriction as to the order in which the servers are accessed by the client. As with any Web search, either server could be accessed first. A link provided initially by the information server may link directly to a map server in accordance with the invention, for example.

In a preferred embodiment, a client device which has the capabilities of both a cellular telephone and a Web browser may pass the names and/or geographical coordinates of its surrounding cellular base stations to the map and/or overlay server computers. Such location information may be utilised by the map server computer to deliver a map of the current location of the client device, and/or by the overlay server computer to identify facilities near to the current location of the client device.

The information relating to the place of interest may be superimposed or overlaid on the map image at a position on the image corresponding to the location of the place of interest on the map. Thus, for example, the information (or "overlay") server may contain details of, for example, hotels, restaurants, shops or the like, associated with the geographical coordinates of each location. The map server contains map data, including coordinate data representing the spatial coordinates of at least one point on the area represented by the map. Further data is also required, so as to enable correlation of points on the map with their corresponding geographical location. Such further data may be, for example, the coordinates of an additional point on the map. Preferably, the map's scale and overall dimensions are included. Alternatively, coordinates of two opposite corners of the map are included. As a further alternative, the said further data may include a simple scale factor and a direction factor.

In a further preferred embodiment, the map server may be provided with a list of categories of places of interest, together with details of the respective information servers on which further information about each category is located. Each of these categories may be associated with a respective icon on the VDU of the client. In an alternative embodiment, such a list of categories may be provided on a further server.

In an embodiment, initially, the client computer may display the map as a simple outline, with no superimposed icons. When one of the "category" icons is activated (for example, by clicking with a mouse or other pointing device), the client computer formulates a request to the appropriate information server for the information server to supply a list of locations known to it which lie within the rectangle defined by the said coordinates. The information supplied by the information server may include textual, graphical, sound, video or other information, and may include additional hypertext links to other locations or facilities on the Web, which themselves may include textual, graphical, sound, video or other information.

It is a particular advantage of the system that the various information servers do not need to have knowledge of the map server software provided on the map server, and vice versa. All that is required in order for the relevant data to be supplied to the client computer is a consistent protocol for providing the coordinates of the various places of interest.

Two or more information servers can provide "places of interest" data independently, without either having any knowledge of the other. For example, one server may provide locations of hotels, a second may provide locations of restaurants, and a third may provide locations of print shops or the like. All of the data (for example, hypertext links, icons etc.) can be overlaid on a single map on the screen of the client computer with hypertext links provided to the various source data on the different overlay or information server computers.

In a particularly preferred embodiment, the client computer may include locating means for establishing the current geographical location of the client computer. This may be by means of a satellite system such as the Global Positioning System. The client computer preferably includes means for passing the said location information to the information server computer. Such location information may be utilised by the information server computer to identify facilities within a given radius of the current geographical location of the client computer. This facility makes the method of the invention of particular usefulness to portable computer systems.

The client computer may include means for scrolling or zooming the map image, to display an image of a different geographical area, and means for varying the displayed data relating to the places of interest, so as to take account of the change in the display geographical area. This may take the form simply of changing the position of the icon or hypertext data relating to particular points of interest, so as to take account of the change in the display geographical area. Preferably, however, the client computer may include means for formulating a further request to an information server, to identify places of interest lying within the new geographical area.

BRIEF DESCRIPTION OF THE DRAWINGS

An embodiment of the present invention will now be described by way of example with reference to the accompanying drawings, in which.

DETAILED DESCRIPTION OF PREFERRED EMBODIMENT

Figure 1:
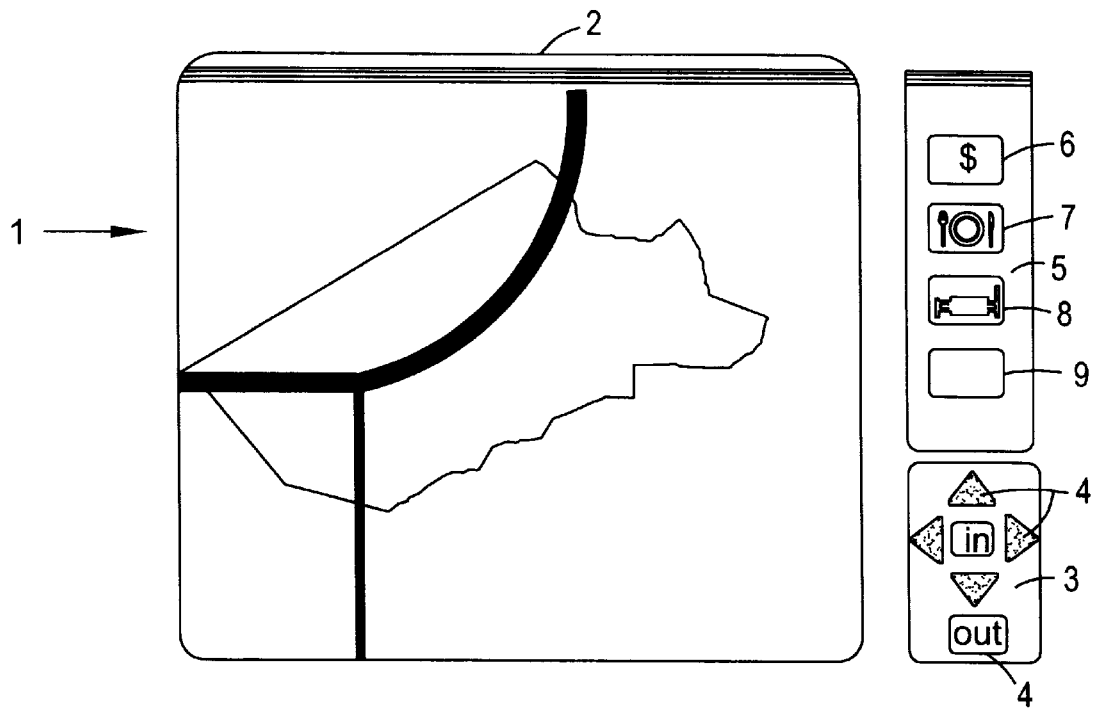
FIG. 1 is a graphical representation of a client screen, showing a simple map with "category" icons.

Referring to FIG. 1, the screen 1 of a client computer 10 is shown, as generated by an HTML document.

The screen 1 contains three windows or frames: a "map" frame 2, a "navigation" frame 3 containing buttons 4 for zooming and panning the map, and an "info" frame 5 which controls the display of overlay information on the map.

Figure 3:
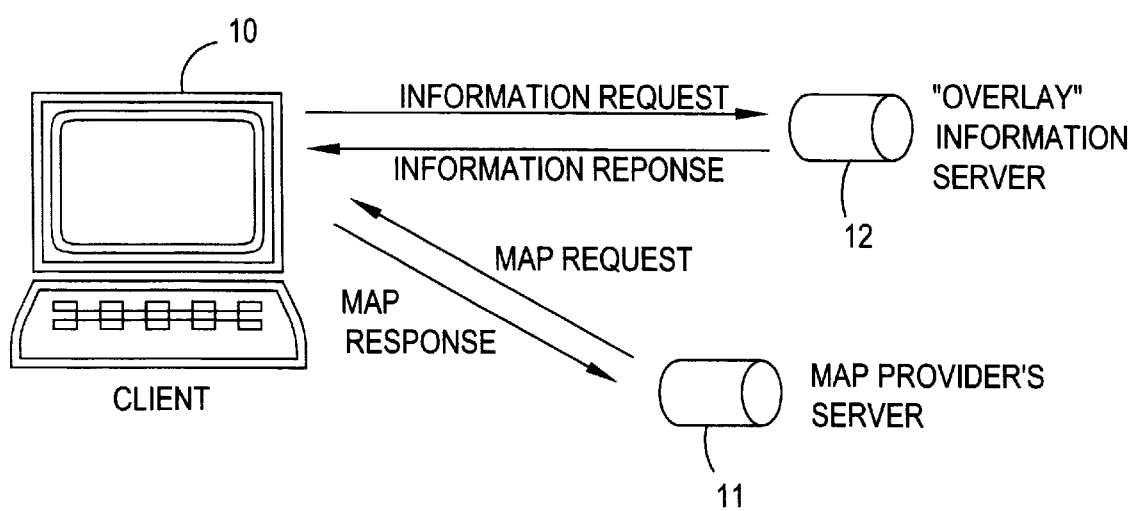

The overall information flow is indicated graphically in FIG. 3. A map request to a map server computer 11 from the client computer 10 specifies the geographical coordinates of the map, which may be the bottom left corner of the map and the top right corner of the map or center point and scale, for example. The coordinates may be supplied to the map server 11 as the latitude and longitude in degrees of the center point of the map and its scale, for example.

The map is supplied by the map server 11 in a map response in any of the various conventional graphics formats, for example in "GIF" or "JPEG" format. In a preferred embodiment, the map server 11 will also return the coordinates covered by the map, but this is not essential as they may be inferred from the map request.

Also supplied by the map server 11 are the icons 6,7,8,9, which are displayed within the "info" frame 5. Icon 6 indicates banks, icon 7 restaurants, icon 8 hotels, etc. Information relating to each category of facilities (banks, restaurants, hotels, etc.) is held on an information server computer 12. The information server computers 12 for the different information categories may be the same or different.

Clicking with the mouse on a respective icon 6–9 causes the client computer 10 to formulate an information request, which may be in the form of a standard Web URL (Uniform Resource Locator) including additional protocol elements relating to the location which the user wishes to search.

An important feature of the present invention is the addition of a universally recognised standard for geographic reference (i.e. longitude and latitude) to the protocols and standards of the Internet and the World Wide Web, and its use to combine data from mutually independent sources.

Information requests produced by the client computer 10 may be of various forms, provided that a protocol is provided for the exchange of the geographical coordinate data.

FIG. 3 shows the two key transaction types used by the client 10. One transaction type consists of the information request, which goes to a provider of information to be overlaid on a map, such as an information server computer 12, followed by a response from that provider 12. The other transaction type is a map request, which goes to a map server computer 11, followed by a map response back to the client 10.

Both request types take the form of Uniform Resource Locators (URLs) which are transmitted in the same way as any other WWW request. Unlike other URLS, the map and information requests contain longitude and latitude information which specify the request's geographical coverage.

In a preferred embodiment, the responses also contain longitude and latitude information, but this is not essential as they may be inferred from the requests.

In a simple embodiment, the information response from the overlay or information server 12 consists of an HTML document. This document contains HTML tags specifying one or more overlay icons and their screen positions. It also specifies the map to be displayed underneath the icons.

In a more advanced embodiment, suitable for client browsers capable of running Java or some other local processing capability, the response from the information server 12 specifies one or more overlay icons and associates a longitude and latitude with each. Longitude and latitude are resolved to screen position by a Java Applet or other locally executed program.

The most important difference between the simple embodiment and the advanced embodiment mentioned above is the point at which the longitude and latitude of overlay icons are resolved to positions on the screen 1 of the client 10. Advanced embodiments place this function within the client browser, where a Java Applet or some other local processing carries out the transformation. In simple embodiments, the transformation is carried out in the information server. Simpler embodiments are therefore less powerful and have less platform-independence, but can be implemented on simple client browsers.

The "map request" shown in FIG. 3 may take the following form:

http://www.multimap.com?lon="−0.1666" &lat="51.545"&scale="25000"&xp="500"&yp="300"

This map request contains parameters specifying the longitude, latitude and scale of the map, and also its dimensions in horizontal and vertical pixels (xp and yp).

An "information request" may be of the form:

http://mcdonalds.com/locations.cgi?lat="51.5449" &lon="−0.16658"&radius="1.6"

This is a search request to a server called mcdonalds.com requesting all locations within a one mile radius of a location in Hampstead, London.

The map requests and information requests may contain any number of elements from an expandable list of parameters, including the following examples:

lat=51.5449 Latitude in degrees, as a single real number lon=−0.16658 Longitude in degrees, as a single real number radius=1.6 Radius in kilometres max=10 Maximum number of locations in search result xp=500 Horizontal size of the map in pixels lon=−0.16658 Longitude in degrees, as a single real number radius=1.6 Radius in kilometres max=10 Maximum number of locations in search result xp=500 Horizontal size of the map in pixels yp=300 Vertical size of the map in pixels scale=25000 Map scale vr=0 Virtual Reality level–0 for "reality", other values specify other "virtual worlds" for testing, simulation or whatever There are a number of other possible terms that may be included.

In simpler embodiments, the map response is an image file encoded in either GIF or JPEG format, for example. It is sent in the same format as other image files on the Web. In more advanced embodiments, the map response may be take the form of either a raster image or vector data, and may be rendered at the client by a Java Applet or other local processing.

The information response can take one of a number of different forms, depending on the capabilities of the client browser.

In a preferred implementation, the information response takes the form of an HTML document which contains references to one or more overlay icons, each with an associated longitude and latitude, together with a call to a Java Applet or some other form of local processing.

In a simpler implementation, the HTML document may contain the screen positions of the icons as pixel offsets rather than longitude and latitude. In this case the positioning of overlay icons on maps is achieved through the positioning capabilities of other HTML functions such as background images, frames, horizontal and vertical image offsets and others.

An example of such an information response is:
<HTML> <BODY background="http://multimap.com?lon=−0.1666&lat=51.545&scale=25000&xp=500&yp=300"> <imgsrc="icon.gif" hspace=240 vspace=140> </BODY></HTML>.

In this example, a map is requested from the map server "multimap.com" and is displayed as a background image, and the icon in the file "icon.gif" is overlaid at the center of the map. Preferably, in order to work correctly, this "map as background" technique should be implemented within a fixed-size frame.

When the user clicks on one of the subject buttons 6–9, the client 10 establishes a connection to the information server whose URL is embedded in the button 6–9. The client 10 sends an information request, as described above.

The information server 12 generates a list of the entries in its database having a longitude and latitude within the bounds specified, and uses them to create an information response, as described above. Each entry is associated with a displayable name and/or icon and optionally a longitude and latitude. The icons or text may be highlighted to show further information such as levels of availability, etc.

The client software normally overlays the displayable names and/or icons on its map.

The user has the option of opening one or more icons from the screen, normally by clicking on the displayable name. This passes the URL to the Web browser which opens it in the usual manner.

Figure 2:
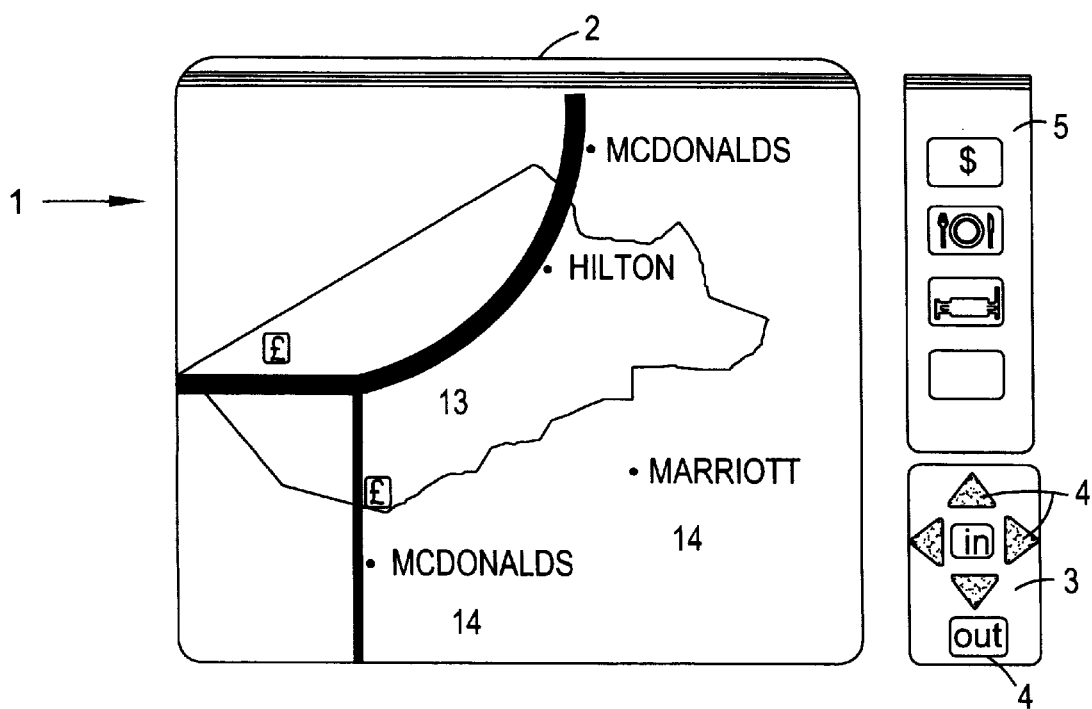
FIG. 2 shows the same map after retrieval of information relating to various places of interest (in this case, hotels and restaurants); and, FIG. 3 is a schematic representation of information flow between the map and overlay servers and the client computer.

In FIG. 2, the current location has been sent to three servers: one run by a high street bank, which returns the location of cashpoint machines, one by an independent hotel reservation system and one by a well-known fast food chain.

The result of the responses by the overlay servers 12 are shown in FIG. 2, in which the same map is displayed with icons 13 representing the various facilities reported by the second server 12, and hypertext links 14 to text pages or other Web facilities, in the usual way.

It should be noted that the client computer 10 may be used to transmit the information request with geographical data first. The overlay or information server 12 responds with information data, including coordinate data, relating to the requested services for example. This data, as well as being used to generate the display on the client computer 10, can be used to formulate the map request including coordinate data for transmission by the client computer 10 to the map server 11. The map server 11 then responds with the map data, which is then transmitted to the client computer 10. The map can then be displayed on the client computer visual display unit and overlaid with graphics representing the information data. In other words, either the map request or the information request can be formulated first for transmission to the appropriate server 11,12.

The architecture of the preferred system is such that it can support a movable map window. A user can scroll North, South, East or West on the screen and see more detail appear, and can zoom in and out for more detail or for a wider perspective using the zoom and move buttons 4. This also enables a moving display, such as a hand-held device or a rolling map installed in a car, to be dynamically updated with new locations as the displayable window moves over them.

Although the client computer 10 may be a stationary PC connected to the Internet, the architecture is designed to support mobile clients such as car navigation systems and personal digital assistants (PDAs). The client software preferably supports direct connection to Global Positioning System (GPS) receivers, and preferably implements the NMEA 0183 standard for exchange of navigational data. If the client is also a cellular telephone, it preferably supports the transfer of information derived from the cellular network. In a preferred embodiment, the client transfers its own position to the information server and map server within the HTTP protocol by adding an HTTP header line to its request messages. In the case that the client is connected to a GPS receiver and therefore knows its exact location, it can add an HTTP header line as follows: remote_position: lon="−0.1666"; lat="51.545". In the case that the client does not have its exact position, but does have access to the name of its nearest cellular base station, it can add an HTTP header line as follows: remote_cellname: LONDON-SW-5. A map server or information server which maintains data on the locations of cellular base stations can convert the cell name to a location and deliver the appropriate map and/or overlay information. In the case that the client is not able to add HTTP header lines as described above, location and/or cell names may be transmitted within other HTTP headers or within the HTML protocol, but such embodiments are not considered preferable. It is important to note that the client will often request information on a location other than its own current location, and that the location of interest is transferred within the Map Request/Information Request URLs, while the client's own location is transferred in the HTTP header. This combination allows the server computers to implement a wide range of additional functions, such as displaying the distance from the current location to the location of interest. In the case that the client's location is known to be changing, such as a cellular phone connected to a GPS receiver, the screen display may be refreshed on a regular basis to show the client's current location. This refresh may be achieved by using the "refresh" function within the HTTP/HTML protocols, or it may be achieved using the local programmability of the client.

It is particularly preferred that the additional functionality provided within the World Wide Web, and its architecture, is built within the extensible framework of HyperText Markup Language (HTML) and the HyperText Transfer Protocol (HTTP). The extensions to HTML/HTTP are thus preferably entirely compatible with existing Web standards and do not seek to modify or replace any part of the Web architecture.

In a preferred embodiment, the functionality described above is added to the client computer 10 by providing additional software for a known Web browser (for example, Netscape, Mosaic, etc.). This software may be implemented as separate programs (i.e. a "helper application"), or as plug-in programs that execute within a browser program, or as Java Applets which are downloaded and executed as required.

Alternatively, a subset of the full functionality may be implemented using the browser's standard display and positioning capabilities only. An.implementation of the latter case requires greater functionality in the information server, and is a preferred implementation in circumstances where it is difficult or impossible to add functionality to the client browser.

The server computers 11,12 may employ well-known standard database tools in conjunction with known Web server packages, in order to recognise the requests and generate the responses described above.

Another important feature of the present invention is that maps and overlay information can be "persistent". That is, pointers to maps or places can be stored in databases on the client computer 10 and become a permanent feature of displays. A typical use of this feature would be to store the user's home location and display it on any map covering that location.

In a preferred embodiment, persistent locations are stored using the extensions to HTTP known as "magic cookies". The magic cookie parameters used are based upon the request parameters listed above, i.e.:

Set-Cookie: Home="lon=−0.1666&lat=51.545";

Software may be provided for the conversion of postal codes (zip codes) into longitude and latitude information. Software may be provided for the conversion of full or partial addresses into longitude and latitude information. This software is normally provided on the map server 11; in this case, the user enters an address or postcode in a form and sends this to the map server. The map server responds with an HTML document containing longitude and latitude, and the user receives a map of the locality of the address or postcode. Alternatively, such software can be provided on the client computer 10.

The system and method of the present invention avoids the classic problems of Geographic Information Systems (GISs) by imposing a single, standardised geographic reference model, and restricting data exchanges to those classes of geographic information which can conform to the reference model.

Because of this, servers providing information do not have to deal with maps, map ownership issues or mapping software, and information from several different sources can be integrated on a single screen.

It is of course envisaged that the invention may be implemented in ways which are different from the ways specifically exemplified above. For example, the coordinate data embodied in the map and facility information may be presented in ways other than in absolute latitude and longitude format.

Embodiments of the present invention have been described with particular reference to the examples illustrated. However, it will be appreciated that variations and modifications may be made to the examples described within the scope of the present invention.

What is claimed is:

1. A method of operating a computer system, the method comprising:

storing on a map server computer map data representative of a map of a geographical area;

storing on the map server computer coordinate data indicative of spatial coordinates of at least one point associated with the geographical area represented by the map, so as to enable correlation of points on the map with their corresponding geographical location;

storing on an information server computer information data relating to at least one place of interest within the geographical area, said information data including data representative of the spatial coordinates of the place of interest within the area;

transmitting a map request to the map server computer from a client computer, and transmitting from the map server computer to the client computer in response to the map request the map data;

utilizing the map data to display an image of the map on a visual display unit associated with the client computer;

transmitting an information request to the information server computer from the client computer, and transmitting from the information server computer to the client computer in response to the information request the information data relating to at least one place of interest within the geographical area; and displaying the information data relating to at least one place of interest on the visual display unit.

2. A method according to claim 1, wherein the map request is transmitted before the information request, the information request being formulated by including coordinate data provided by the map server computer.

3. A method according to claim 1, wherein the information request is transmitted before the map request, the map request being formulated by including coordinate data provided by the information server computer.

4. A method according to claim 1, including superimposing information relating to the place of interest on the image on the visual display unit, at a position on the image corresponding to the location of the place of interest on the map.

5. A method according to claim 1, wherein the client computer includes means for zooming the map image in or out to display an image of, respectively, a smaller or larger geographical area, and means for varying the displayed data relating to the at least one place of interest on the visual display unit so as to take account of the smaller or larger geographical area.

6. A method according to claim 5, wherein the client computer includes means for formulating a further request to the information server computer, to identify places of interest lying within the smaller or larger geographical area.

7. A method according to claim 1, including:

storing on the map server computer a list of categories of places of interest;

retrieving the list with the map data; and displaying on the visual display unit a respective icon for each said category.

8. A method according to claim 1, wherein the request is effected by activation of a respective icon on the visual display unit.

9. A method according to claim 1, wherein the client computer includes locating means for establishing the current geographical location of the client computer, and the method includes passing the current geographical location of the client computer to at least one of the map server computer and the information server computer.

10. A method according to claim 9, wherein the locating means uses the Global Positioning System.

11. A method according to claim 9, wherein the locating means includes a cellular telephone.

12. A method according to claim 9, wherein the client computer includes means for superimposing on the image an icon indicative of the current geographical location.

13. The method of claim 1, wherein the client computer communicates with the map server computer and the information server computer via a World Wide Web.

14. The method of claim 13, wherein the displaying of the information data on the video display unit is performed by using an internet browser.

15. The method of claim 1, wherein the map data transmitted from the map server computer is an image file.

16. A method of operating a computer system, the method comprising:

storing on a map server computer map data representative of a map of a geographical area;

storing on the map server computer coordinate data indicative of the spatial coordinates of at least one point associated with the geographical area represented by the map, so as to enable correlation of points on the map with their corresponding geographical location;

storing on an information server computer information data relating to at least one place of interest within the geographical area, said information data including data representative of the spatial coordinates of the place of interest within the area;

transmitting a map request to the map server computer from a client computer, and transmitting from the map server computer to the client computer in response to the map request the map data;

utilizing the map data to display an image of the map on a visual display unit associated with the client computer;

transmitting an information request to the information server computer from the client computer, and transmitting from the information server computer to the client computer in response to the information request the information data relating to at least one place of interest within the geographical area;

displaying the information data relating to at least one place of interest on the visual display unit; and superimposing information relating to the place of interest on the image on the visual display unit, at a position on the image corresponding to the location of the place of interest on the map, wherein
the information superimposed on the image is a hypertext link.

17. A method of operating a computer system, the method comprising:

storing on a map server computer map data representative of a map of a geographical area;

storing on the map server computer coordinate data indicative of the spatial coordinates of at least one point associated with the geographical area represented by the map, so as to enable correlation of points on the map with their corresponding geographical location;

storing on an information server computer information data relating to at least one place of interest within the geographical area, said information data including data representative of the spatial coordinates of the place of interest within the area;

transmitting a map request to the map server computer from a client computer, and transmitting from the map server computer to the client computer in response to the map request the map data;

utilizing the map data to display an image of the map on a visual display unit associated with the client computer;

transmitting an information request to the information server computer from the client computer, and transmitting from the information server computer to the client computer in response to the information request the information data relating to at least one place of interest within the geographical area;

displaying the information data relating to at least one place of interest on the visual display unit; and superimposing information relating to the place of interest on the image on the visual display unit, at a position on the image corresponding to the location of the place of interest on the map, wherein the client computer includes means for scrolling the map image to display an image of a different geographical area, and means for varying the displayed data relating to the at least one place of interest on the visual display unit so as to take account of the change in the displayed geographical area.

18. A method according to claim 17, wherein the varying of the displayed data includes shifting the position of the superimposed information in response to scrolling of the map image.

19. A method according to claim 18, wherein the client computer includes means for formulating a further request to the information server to identify places of interest lying within the different geographical area.

20. A computer system, the computer system comprising:
a map server computer for storing map data representative of a map of a geographical area and coordinate data representative of the spatial coordinates of at least one point lying within the area represented by the map;

an information server computer for storing information data representative of at least one place of interest within the geographical area, said data including data representative of the spatial coordinates of the place of interest within the area; and a client computer, the client computer having a visual display unit;

wherein the client computer includes
means for transmitting a map request to the map server computer to request transfer to the client computer of the map data,
means for displaying an image of the map on the visual display unit, and
means for transmitting an information request to the information server computer to identify places of interest known to it and lying within the geographical area, wherein the information server computer includes means for transmitting to the client computer in response to the information request the data representative of at least one place of interest within the geographical area, and wherein the client computer includes means for displaying said data associated with the place of interest on the visual display unit.

21. A computer system according to claim 20, wherein the client computer includes means for formulating the information request by including coordinate data provided by the map server computer.

22. A computer system according to claim 20, wherein the client computer includes means for formulating the map request by including coordinate data provided by the information server computer.

23. A computer system according to claim 20, wherein the client computer includes means for superimposing information relating to the place of interest on the image on the visual display unit, at a position on the image corresponding to the location of the place of interest on the map.

24. A computer system comprising:
a map server computer for storing map data representative of a map of a georaphical area and coordinate data representative of the spatial coordinates of at least one point lying within the area represented by the map;

an information server computer for storing information data representative of at least one place of interest within the geographical area, said data including data representative of the spatial coordinates of the place of interest within the area; and a client computer, the client computer having a visual display unit;

wherein the client computer includes
  means for transmitting a map request to the map server computer to request transfer to the client computer of the map data,
  means for displaying an image of the map on the visual display unit, and
  means for transmitting an information request to the information server computer to identify places of interest known to it and lying within the geographical area,
wherein the information server computer includes means for transmitting to the client computer in response to the information request the data representative of at least one place of interest within the geographical area,
the client computer includes means for displaying said data associated with the place of interest on the visual display unit,
the client computer includes means for superimposing information relating to the place of interest on the image on the visual display unit, at a position on the image corresponding to the location of the place of interest on the map, and
the information superimposed on the image is a hypertext link.

25. A computer system according to claim 20, wherein the client computer includes means for zooming the map image in or out to display an image of, respectively, a smaller or larger geographical area, and means for varying the displayed data relating to the at least one place of interest on the visual display unit so as to take account of the smaller or larger geographical area.

26. A computer system according to claim 25, wherein the client computer includes means for formulating a further request to the information server computer, to identify places of interest lying within the smaller or larger geographical area.

27. A computer system according to claim 20, wherein the client computer includes locating means for establishing the current geographical location of the client computer and means for passing the current geographical location of the client computer to at least one of the map server computer and the information server computer.

28. The computer system of claim 20, wherein the client computer is connected to the map server computer and the information server computer via a World Wide Web.

29. The computer system of claim 28, wherein the means for displaying an image of the map on the video display unit comprises an internet browser.

30. The computer system of claim 20, wherein the map data is in a form of an image file.

31. A computer system, the computer system comprising:
  a map server computer for storing map data representative of a map of a geographical area and coordinate data representative of the spatial coordinates of at least one point lying within the area represented by the map;
  an information server computer for storing information data representative of at least one place of interest within the geographical area, said data including data representative of the spatial coordinates of the place of interest within the area; and
  a client computer, the client computer having a visual display unit;
  wherein the client computer includes
    means for transmitting a map request to the map server computer to request transfer to the client computer of the map data,
    means for displaying an image of the map on the visual display unit, and
    means for transmitting an information request to the information server computer to identify places of interest known to it and lying within the geographical area,
  wherein the information server computer includes means for transmitting to the client computer in response to the information request the data representative of at least one place of interest within the geographical area,
  the client computer includes means for displaying said data associated with the place of interest on the visual display unit,
  the client computer includes means for superimposing information relating to the place of interest on the image on the visual display unit, at a position on the image corresponding to the location of the place of interest on the map, and
  the client computer includes means for scrolling the map image to display an image of a different geographical area, and means for varying the displayed data relating to the at least one place of interest on the visual display unit so as to take account of the change in the displayed geographical area.

32. A computer system according to claim 31, wherein the client computer includes means for varying the information from the information server computer which is displayed, in response to scrolling of the map image.

33. A computer system according to claim 32, wherein the client computer includes means for formulating a further request to the information server computer, to identify places of interest lying within the different geographical area.

34. A computer system comprising:
  a map server computer for storing map data representative of a map of a geographical area and coordinate data representative of the spatial coordinates of at least one point lying within the area represented by the map;
  an information server computer for storing information data representative of at least one place of interest within the geographical area, said data including data representative of the spatial coordinates of the place of interest within the area; and
  a client computer, the client computer having a visual display unit;
  wherein the client computer includes
    a map requesting mechanism for transmitting a map request to the map server computer to request transfer to the client computer of the map data,
    a map image displaying mechanism for displaying an image of the map on the visual display unit, and
    an information request transmitting mechanism for transmitting an information request to the information server computer to identify places of interest known to it and lying within the geographical area,
  wherein the information server computer includes a response transmitting mechanism for transmitting to the client computer in response to the information request the data representative of at least one place of interest within the geographical area, and
  wherein the client computer includes a display mechanism for displaying said data associated with the place of interest on the visual display unit.

35. A computer system, the computer system comprising:
  a map server computer for storing map data representative of a map of a geographical area and coordinate data representative of the spatial coordinates of at least one point lying within the area represented by the map; and an information server computer for storing information data representative of at least one place of interest within the geographical area, said data including data representative of the spatial coordinates of the place of interest within the area;

the map server computer being arranged to receive a map request from a client computer to request transfer to a said client computer of the map data and to transmit the map data to said client computer in response thereto, the client computer having a visual display unit for displaying an image of the map, and the information server computer being arranged to receive an information request from said client computer to identify places of interest known to it and lying within the geographical area, and to transmit to said client computer in response thereto the data representative of at least one place of interest within the geographical area, whereby said data associated with the place of interest is displayed on the visual display unit of said client computer.

36. A client computer comprising:

a visual display unit;

means for transmitting a map request to a map server computer to request transfer to the client computer of map data;

means for transmitting an information request to an information server computer to identify places of interest known to the information server computer and lying within a geographical area; and means for displaying an image of a map and data relating to at least one of the places of interest on the visual display unit, wherein:

the map server computer is arranged to store the map data representative of the geographical area and coordinate data representative of spatial coordinates of at least one point lying within the area represented by the map, and the information server computer is arranged to store information data representative of the at least one of the places of interest within the geographical area, said data including data representative of the spatial coordinates of a place of interest within the area.

37. The client computer of claim 36, wherein the client computer is arranged to send location information, including a longitude and a latitude, within the map request.

* * * * *

UNITED STATES PATENT AND TRADEMARK OFFICE
CERTIFICATE OF CORRECTION

| | |
|---|---|
| PATENT NO. | : 6,240,360 B1 |
| DATED | : May 29, 2001 |
| INVENTOR(S) | : Phelan |

It is certified that error appears in the above-identified patent and that said Letters Patent is hereby corrected as shown below:

<u>Title page,</u>
Item [86] please change "PCT Filed: August 16, 1996" to -- [86] PCT Filed: August 15, 1996 --

Signed and Sealed this

Fourteenth Day of May, 2002

Attest:

JAMES E. ROGAN
*Attesting Officer*  *Director of the United States Patent and Trademark Office*